July 8, 1924.
P. BRÜHL
1,500,485
METHOD AND DEVICE FOR GRINDING BALLS OR ROLLERS
Filed Oct. 11, 1920  2 Sheets-Sheet 1
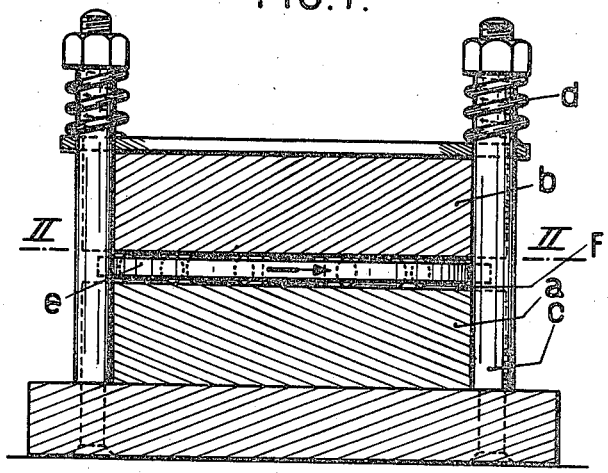
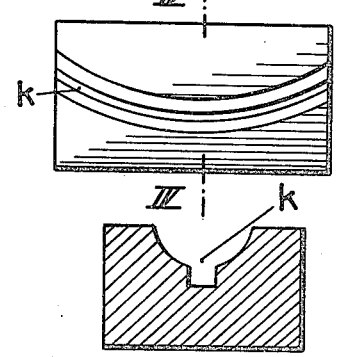
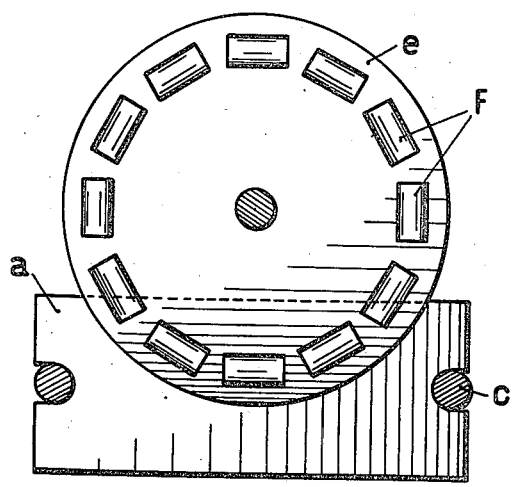
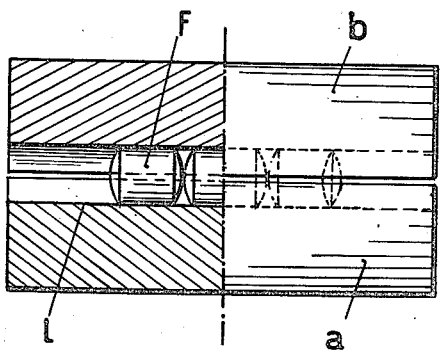
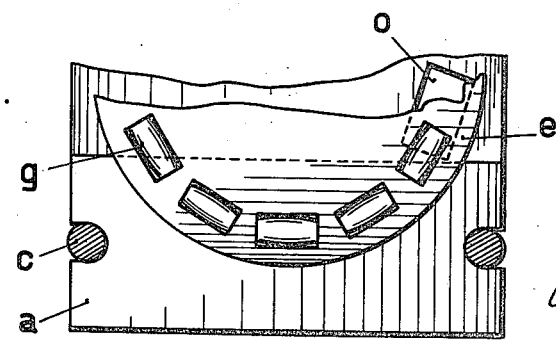
INVENTOR:
Paul Brühl

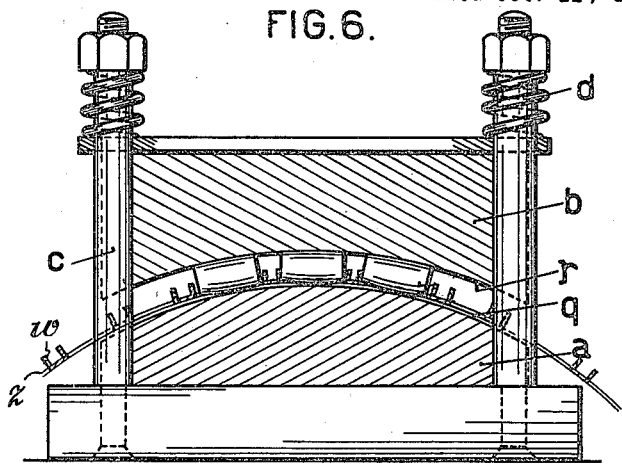
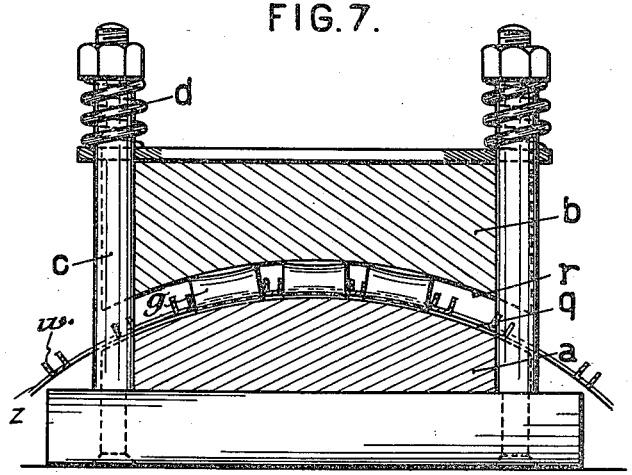
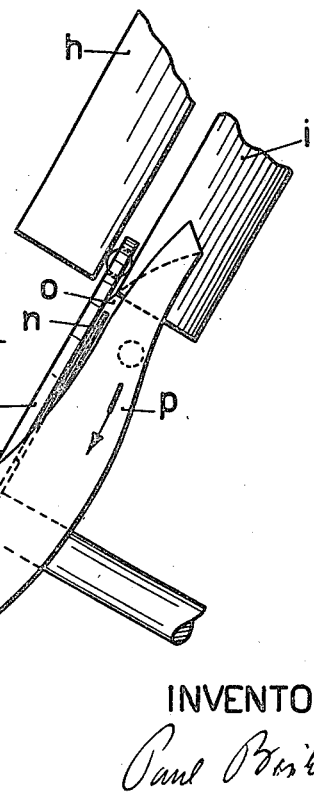

Patented July 8, 1924.

1,500,485

UNITED STATES PATENT OFFICE.

PAUL BRÜHL, OF DUSSELDORF, GERMANY, ASSIGNOR TO MASCHINENFABRIK RHEINLAND A. G., OF DUSSELDORF, GERMANY, A FIRM.

METHOD AND DEVICE FOR GRINDING BALLS OR ROLLERS.

Application filed October 11, 1920. Serial No. 416,300.

*To all whom it may concern:*

Be it known that I, PAUL BRÜHL, a citizen of the German Empire, residing at Dusseldorf, Germany, have invented certain new and useful Improvements in Methods and Devices for Grinding Balls or Rollers, of which the following is a specification.

My invention refers to the art of grinding, and more especially to a method and a machine for grinding rollers or balls. The grinding machines hitherto known for grinding rollers or balls, are based upon the principle of inserting the rollers or balls between two grinding wheels of which at least one is rotated, so that the rollers or balls are also rotated during the grinding process owing to the rolling motion imparted to them. In employing such grinding machines experience has proved that the rollers are frequently ground more or less triangularly, the extent of such deviation from the true shape even amounting up to more than 0.01 mm, a fact which is due to the variable speeds with which the rollers are very often rolled in the grinding machine.

My invention entirely abandons the above method, the characteristic feature of my invention being contained in the fact that the rollers or balls—or, for that matter, any other pieces such as cylindrical plates the faces of which are to be ground—are conducted between two surfaces without any rotation of their own, the two said surfaces pressing against one another and at least one of them being a grinding surface. In the course of the process the balls or rollers are passed through the stationary grinding blocks repeatedly and in different positions, the rollers or balls thus being ground to a perfect roundness.

A grinding machine for performing this process mainly consists of two grinding blocks which are pressed against one another, and of a rotating cage the axis of rotation of which is situated outside the grinding blocks, the said cage containing the rollers or balls to be ground and maintaining them in a position in which they are secured against rotating.

One of the two grinding blocks is preferably made of non-grinding material such as cast iron or hardened steel, and is fitted with a guiding groove of a suitable cross-section which is provided for the purpose of guiding the balls or rollers to be ground. If a rotating cage, arranged eccentrically in regard to the grinding blocks, is employed, the guiding groove provided in the one block, is curved in the shape of a circle corresponding to the path of the pieces to be ground.

The rollers or balls may, however, also be taken through the two grinding blocks in a straight line.

In the drawings affixed to this specification and forming part thereof, different modifications of a grinding machine embodying my invention are illustrated by way of example. In the drawings—

Fig. 1 is a cross-section of a grinding machine illustrated in a purely diagrammatical manner, whilst Fig. 2 is the plan of the machine, taken on the line II—II of Fig. 1, also in a purely diagrammatical manner.

Fig. 3 is a plan of a grinding block with a grinding groove, whilst

Fig. 4 is the pertinent cross-section taken on the line IV—IV of Fig. 3.

Fig. 5 is a different modification of the device for grinding rollers, the illustration being partly a section and partly a view.

Figs. 6 and 7 are cross-sections of two different modifications of machines for grinding rollers, the illustrations being purely diagrammatical.

Fig. 8 is a side view of the general arrangement of the machine complete with the device for returning the rollers or balls to the charging receptacle, whilst Fig. 9 is the pertinent plan view of a part of the machine.

The grinding machine for rollers illustrated in Figs. 1 and 2, respectively, possesses two grinding blocks $a$, $b$, which are kept in position by bolts $c$ and pressed against one another by means of springs $d$. A cage $e$ is arranged so as to be rotatable, and eccentrically as regards the blocks $a$, $b$, the said cage taking the rollers F through the grinding blocks $a$ and $b$ on a circular path, whilst maintaining the rollers rigidly in position. After passing through the grinding machine the rollers F must always be returned to the cage $e$ in an altered position.

In the place of the grinding block $a$ cast-iron body possessing a guiding groove like the one marked $k$ in Fig. 3, which is curved to correspond to the path of the rollers or balls, may also be employed for the purpose of grinding rollers or balls. Fig. 4 represents the block including the guiding groove *k* which, in the case of the block illustrated, is designed for the reception of balls. When employing such a cast-iron body instead of the grinding block *a*, the grinding of the rollers or balls takes place solely on those surfaces which are turned upwards.

Fig. 5 shows a different modification in which the lower block *a* is provided with a guiding groove *l* which mainly follows a straight line and in which the rollers are taken through the grinding device in a straight line and in the direction of their axes. The rollers F then work a straight groove into the grinding block *b* automatically, so that a very considerable portion of their outer surface is already ground by the machine on the rollers passing through the machine once. In the arrangement illustrated in Fig. 5, it is again advisable to make the block *a* of cast iron.

The machines for grinding rollers illustrated in Figs. 6 and 7 also possess two rigid blocks *a* and *b* which are pressed against one another by springs *d*; they are, however, distinguished from the modifications described above, by the surfaces *q* and *r* delimiting the space through which the rollers *g* to be ground are passed in some way or other for instance by means of a flexible steel band *z* with upturned tongue *w*, being designed so as to be curved concentrically in regard to one another. In the case of a machine designed for grinding rollers designed according to Fig. 6, only the block *b* which is provided with the concavely curved path, consists of grinding material, whilst the block *a* fitted with the convex path, is made of hardened steel. By shaping the blocks *a* and *b* in this manner the grinding process results in rollers of barrel shape being produced, the convexity of the outer surfaces of these rollers then corresponding to the convexity of the path *r*. Instead of making the entire block *b* of grinding material, the surface marked *r* could also be converted into a grinding surface by the addition of grinding material, whilst the block itself is made of nongrinding material. Rollers with outer surfaces of varying curvature are obtained by choosing corresponding curvatures for the paths *q* and *r*.

In the case of the grinding machine represented in Fig. 7, the block *a* which is curved convexly, consists of grinding material, or the surface *q* alone may be made to act as a grinding surface, whilst the block *b* itself consists of hardened steel. Such a grinding machine then produces rollers the outer surfaces of which are curved concavely, as may be observed in Fig. 7, the concave curvature of the outer surfaces corresponding to the curvature of the path *q*.

Figs. 8 and 9 show the general arrangement of a grinding machine complete with the device for returning the rollers or balls to the charging receptacle. The machine illustrated in the above figures, is provided with a cage *e* having a considerable inclination and arranged so as to be rotatable around the axis *s*, the said cage taking the rollers or balls through the grinding blocks *a* and *b* which are also inclined. The lowest portion of the cage *e* reaches into a charging receptacle *m* into which the rollers or balls are put and whence they are taken to the grinding blocks through the agency of the holes provided in the cage *e*. During their journey to the grinding blocks the rollers or balls are supported on a strip of sheet metal *n* fitted in beneath the cage *e*. This strip of sheet metal is provided with an aperture *o* located in the path of the pieces to be ground and following immediately on the exit of the said pieces from the grinding blocks, the rollers or balls thus falling through the aperture *o* on having passed through the grinding machine. On dropping the pieces are caught in a chute *p* which, generally speaking, is less inclined than the cage and which automatically returns the pieces to the charging and mixing receptacle *m*, whence they again proceed to the grinding blocks through the agency of the cage *e*, whilst most certainly having attained a different position as compared to the one they had when previously passing through the machine.

This process of passing the rollers or balls through the grinding blocks and of returning the rollers or balls to the charging receptacle *m* via the chute *p* is repeated until the grinding of the rollers or balls is completed.

In a grinding machine of the type described the wear and tear to which the cage is subjected, is nil, or at all events only very small, owing to the fact that the rollers or balls are stationary in regard to the holes of the cage and that consequently no grinding action is caused between the rollers or balls on the one hand and the holes of the cage on the other.

I claim:

1. The method of grinding workpieces with curved surfaces such as balls or rollers, consisting in imparting to the workpiece a great number of short passes between and in contact with non-rotating surfaces pressed against one another, preventing said workpiece from turning while in contact with said surfaces and turning it between each two consecutive passes.

2. The method of grinding workpieces with curved surfaces such as balls or rollers, consisting in causing the workpiece to describe a great number of consecutive short passes in non-closed curves between and in contact with two non-rotating surfaces pressed against one another, preventing said workpieces from turning while in contact with said surfaces, and turning it between each two consecutive passes.

3. In a device of the kind described in combination, two non-rotating blocks, resilient means for pressing said blocks towards each other, at least one of the contiguous block surfaces being a grinding surface, a work piece support, rotatable about an axis which is located outside said blocks, partly inserted between said blocks, means connected with said support for rigidly fixing said work piece thereon, and a groove in one of said blocks, which follows the path of said work piece.

4. In a device of the kind described in combination, two non-rotating blocks, resilient means for pressing said blocks towards each other, at least one of the contiguous block surfaces being a grinding surface, a work piece support, rotatable about an axis which is located outside said blocks, partly inserted between said blocks, means connected with said support for rigidly fixing said work piece thereon, and a groove in the non-grinding block, said groove following the path of said work piece.

5. In a device of the kind described in combination, two non-rotating blocks, resilient means for pressing said blocks towards each other, at least one of the contiguous block surfaces being a grinding surface, a work piece support, rotatable about an axis which is located outside said blocks, partly inserted between said blocks, means connected with said support for rigidly fixing said work piece thereon and a straight groove in one of said blocks.

6. In a device of the kind described in combination, a machine bed, a pair of stationary blocks disposed in an oblique position relatively to said bed, means for resiliently pressing said blocks towards each other, at least one of the contiguous surfaces being a grinding surface, a cage in oblique position rotatable about an axis located outside said blocks, a receptacle below said cage and in operative contact therewith and a chute underneath said cage.

In testimony whereof I affix my signature.

PAUL BRÜHL.